United States Patent [19]
Stolzer

[11] 4,016,987
[45] Apr. 12, 1977

[54] STORAGE SYSTEM

[75] Inventor: Paul Stolzer, Achern, Germany

[73] Assignee: Stopa Stahlbau GmbH & Co., Achern (Gamshurst), Germany

[22] Filed: Apr. 14, 1976

[21] Appl. No.: 676,885

Related U.S. Application Data

[63] Continuation-in-part of Ser. No. 475,242, May 31, 1974, Pat. No. 3,977,542.

[30] Foreign Application Priority Data

Apr. 23, 1975 Germany .......................... 2517900

[52] U.S. Cl. ........................... 214/16.4 A; 214/730; 214/750
[51] Int. Cl.² ............................................. B65G 1/06
[58] Field of Search ............ 214/16.4 A, 730, 731, 214/750, 75 R

[56] References Cited

UNITED STATES PATENTS

| | | | |
|---|---|---|---|
| 2,995,263 | 8/1961 | Fitch | 214/731 |
| 3,092,268 | 6/1963 | Powers | 214/730 |
| 3,096,896 | 7/1963 | Norton et al. | 214/730 |
| 3,545,636 | 12/1970 | Yarbrough | 214/731 |
| 3,567,055 | 3/1971 | Preto | 214/730 |
| 3,667,618 | 6/1972 | Bertola | 214/16.4 A |

Primary Examiner—Lawrence J. Oresky
Attorney, Agent, or Firm—Spencer & Kaye

[57] ABSTRACT

A storage system has a plurality of storage frames. The storage frames are filled or emptied by a gantry having a plurality of fork tines which can be shifted between a first and second operative positions which are 90° apart. The tine can also be tilted as it is moved between an advanced and withdrawn position relative to the storage racks.

18 Claims, 9 Drawing Figures

STORAGE SYSTEM

CROSS-REFERENCE TO RELATED APPLICATION

This application is a continuation-in-part of copending application Ser. No. 475,242, filed May 31, 1974 now U.S. Pat. No. 3,977,542 issued Aug. 31, 1976.

BACKGROUND OF THE INVENTION

This invention relates to a storage system which is installed in a storage area and which includes a plurality of article-supporting storage frames each having a length dimension extending parallel to the width of the storage area. The storage frames are arranged parallel-spaced and form a series extending parallel to the depth dimension of the storage area.

Each storage frame has at its longitudinal ends a column of superimposed, parallel-spaced storage racks; each storage rack is oriented in the direction of depth of the storage area. The articles stored in the frames are supported, either directly or indirectly, by racks which are arranged at opposite ends of the frame and at the same height level and which are oriented in the same direction.

For a better utilization of the storage area, the storage frames are expediently displaceable towards one another.

The storage system further includes an article handling (article depositing and removing) apparatus which essentially comprises a gantry movable on rails in the direction of depth of the storage area. The gantry includes a cross beam which extends parallel to the width dimension of the storage area and which may be raised above the level of the storage frames or lowered all the way to the ground in the space (service area) between any two selected storage frames after proper positioning of the gantry.

The cross beam carries a plurality of tines each having two tine arms arranged at substantially 90° to one another. The tines may be switched in unison so that they extend selectively either in the one or the other direction of the depth of the storage area for the purpose of depositing articles on or removing them from the one or the other storage frame bounding the same service area while the cross beam is positioned at the proper height in the service area. The switching of the tines from one operative position to the other is effected by a deflection bar extending in the direction of width of the storage area and attached to the top of each storage frame. As the cross beam is lowered from a position above the storage frames, horizontally extending tine arms that point towards the deflection bar of the storage frame which is immediately adjacent the cross beam, abut against that deflection bar and thus the tines are in unison switched, whereby their heretofore idle vertical arm will extend horizontally, but in the opposite direction towards the other storage frame located adjacent the cross beam. Simultaneously, the heretofore active horizontal tine arms will assume an idle, vertical position.

Expediently, the tines are displaceable on the cross beam in the direction of width of the storage area to ensure an optimum horizontal adjustment of the tines with respect to the articles to be handled.

Particularly if loose, rod-like members are handled (which usually engage directly the racks of the storage frames), difficulties may be encountered during deposition or removal, because the individual rods may have the tendency to roll off the horizontal tines. In order to avoid such an undesired occurrence, it has been necessary to significantly reduce the travelling speed of the gantry and particular care had to be taken to ensure small acceleration or deceleration values.

SUMMARY OF THE INVENTION

It is an object of the invention to provide an improved storage system of the above-outlined type in which the articles carried by the tines are prevented from falling off the tines by a simple, robust and operationally safe arrangement without increasing the spatial requirements in the zone of operation.

It is an advantage of the invention that the article handling apparatus may operate at higher speeds as well as greater accelerations and decelerations than heretofore possible.

This object and others to become apparent as the specification progresses, are accomplished by the invention, according to which, briefly stated, each tine is secured to the cross beam by a suspension which includes a carrier arm extending generally vertically downwardly from an underside of the cross beam; a joint for securing the tine to said lower end of the carrier arm, a mounting for displaceably securing the carrier arm at its upper end beneath the cross beam adjacent the underside thereof. The mounting defines for the carrier arm, a horizontal path of travel extending perpendicularly to the length dimension of the cross beam and having a length approximately corresponding to the width of the cross beam measured parallel to the depth of the storage area. The carrier arm has first and second opposite end positions at respective opposite ends of the path of travel. When the tine is in its first operative position and simultaneously, the carrier arm is in its first end position, the tine will assume an advanced condition in which the first tine arm projects substantially beyond the cross-sectional outline of the cross beam. When the tine is in its first operative position and simultaneously, the carrier arm is in its second end position, the tine will assume a withdrawn condition in which substantially the entire tine is disposed within the crosssectional outline of the cross beam. If the tine is in its second operative position, it will assume an advanced condition when the carrier arm is in its second end position and a withdrawn condition when the carrier arm is in its first end position. The suspension further has a device for tilting the tine about its joint in the course of the displacement of the carrier arm and the tine from an advanced condition into a withdrawn condition for effecting a more inclined orientation of the horizontal tine arm downwards towards the tine joint in the withdrawn condition than in the advanced condition in the same operative position of the tine.

It is thus an important advantage of the invention that the articles are prevented from falling off the tine arm by virtue of its inclined positioning after the articles are withdrawn from or before they are deposited on the storage frames by the tine arm. As a result, the gantry may be moved with higher speed and higher acceleration and deceleration values than heretofore, thus increasing the overall efficiency of the storing and retrieving operation of the storage system.

DESCRIPTION OF THE PREFERRED EMBODIMENTS

Figure 1:
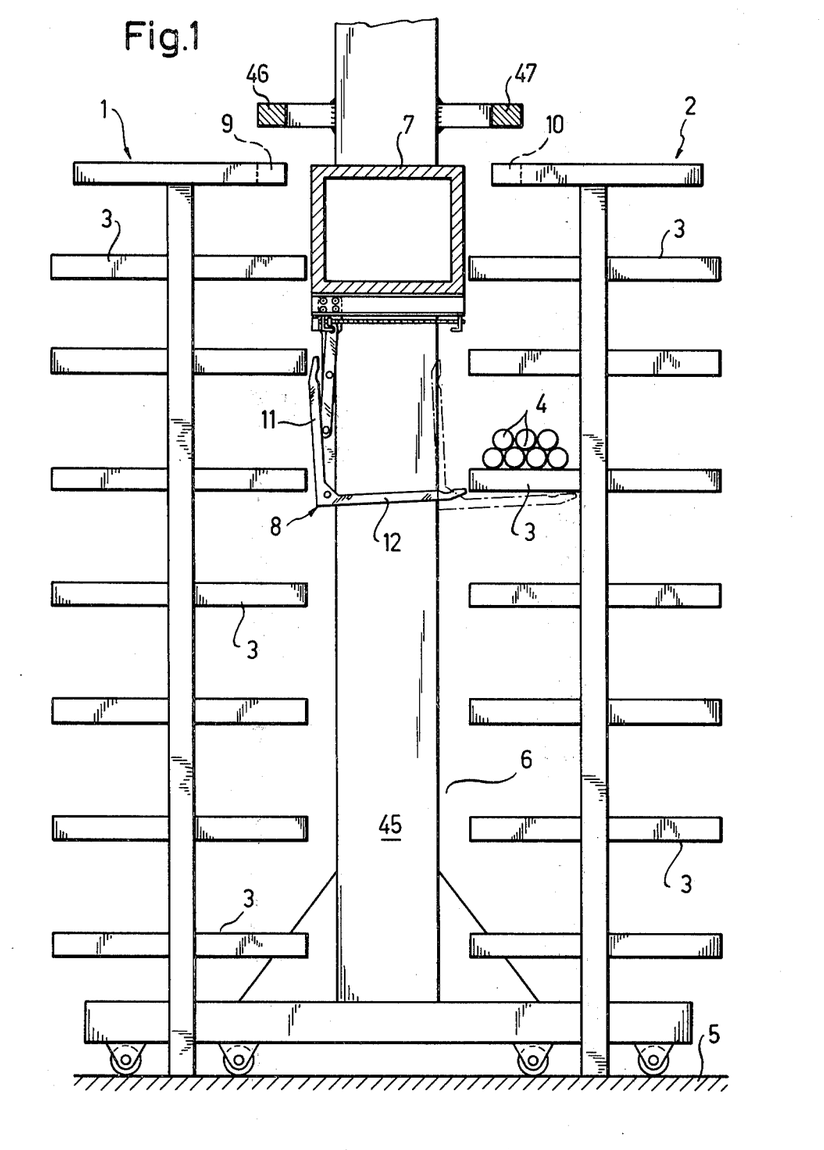
FIG. 1 is a side elevational view of a storage system incorporating a first preferred embodiment of the invention.

Turning now to FIG. 1, there are shown two adjoining storage frames 1 and 2 both having columns of parallel-spaced, superposed storage racks 3. Each storage frame has at least two rack columns, arranged, for example, at the two longitudinal ends of the storage frame (in FIG. 1, only one rack column is visible in each storage frame). In each storage frame, rod-like articles 4 may be supported on racks 3 arranged at the same height level and oriented in the same direction. It is noted that the storage system generally comprises a great number of storage frames such as 1 and 2 arranged in an aligned series which extend in the direction of depth of the storage area. Each storage frame may, as illustrated in FIG. 1, be stationarily anchored in the ground 5 with a servicing area 6 therebetween or the storage frames may be arranged displaceably (for example, provided with casters), so that a single, shiftable service area 6 will then serve more than two storage frames.

A cross beam 7 of a mobile gantry 45 extends in the direction of width of the storage area and may be lowered from above the storage frames into the service area 6 between any selected two adjoining storage frames. The cross beam 7 pivotally supports a plurality of tines 8 (only one shown) which are disposed underneath the cross beam 7 and which are pivotal about an axis extending perpendicularly to the plane of the drawing. Each tine 8 is constituted by tine arms 11 and 12 extending at right angles to one another. Each tine 8 has a first operative position in which the tine arm 11 is disposed horizontally whereas the tine arm 12 is arranged vertically, and a second operative position in which the tine arm 11 extends vertically and the tine arm 12 is positioned horizontally. In each instance, the horizontally positioned tine arm is the active member whereas the vertically arranged tine arm is the idling member. The switching of the tines from the one operative position to another may be effected by one of the deflection bars 9, 10 attached to the storage frames 1 and 2, respectively, and extending in a direction parallel to the cross beam 7 and thus perpendicularly to the racks 3.

It is assumed that the cross beam 7; prior to its lowering between two adjoining storage frames into the service area 6 carries at least some of the tines 8 in such an orientation that their tine arm 11 is disposed horizontally while their tine arm 12 is directed vertically. Upon lowering the cross beam 7, the horizontally-extending tine arms 11 abut against the deflection bar 9 and, as a result, the respective tines 8 are flipped so that each tine arm 11 will assume a vertical position and each tine arm 12 will extend horizontally towards the storage frame 2 as illustrated in FIG. 1.

Figure 2:
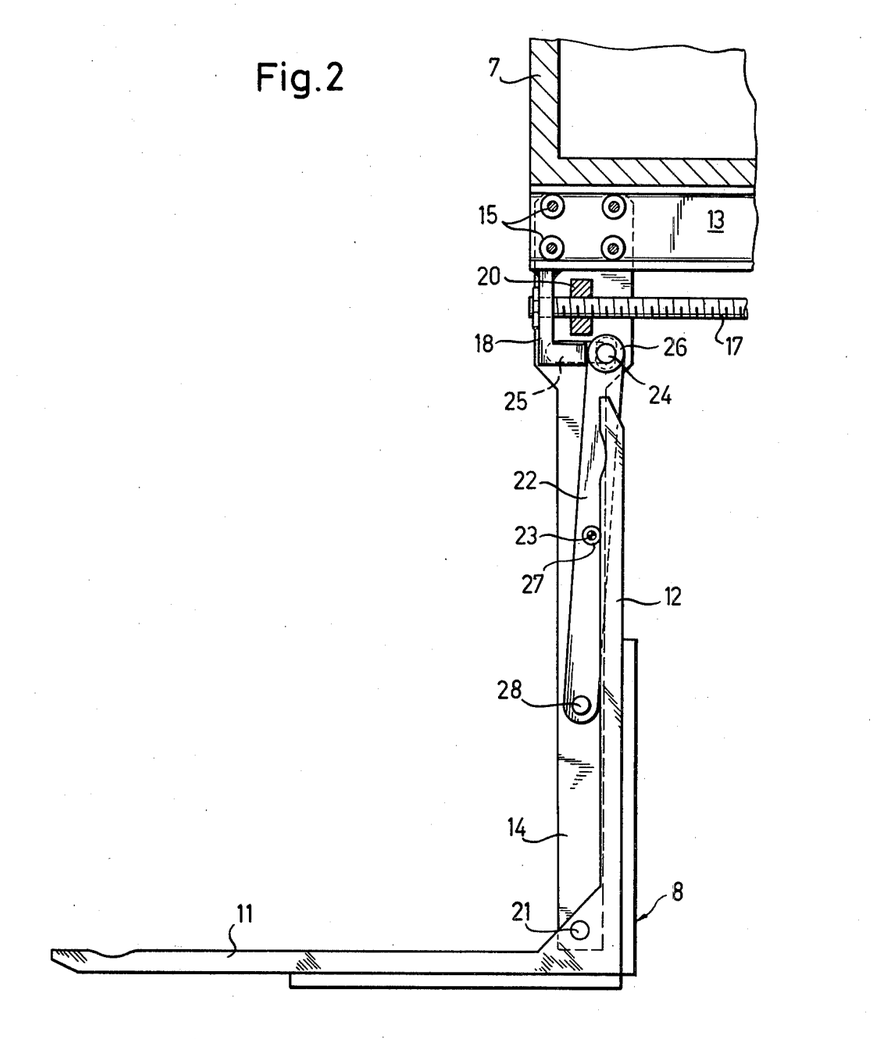
FIGS. 2 and 3 are side elevational views of the same embodiment in an advanced and in a withdrawn position of the tine, respectively.
Figure 3:
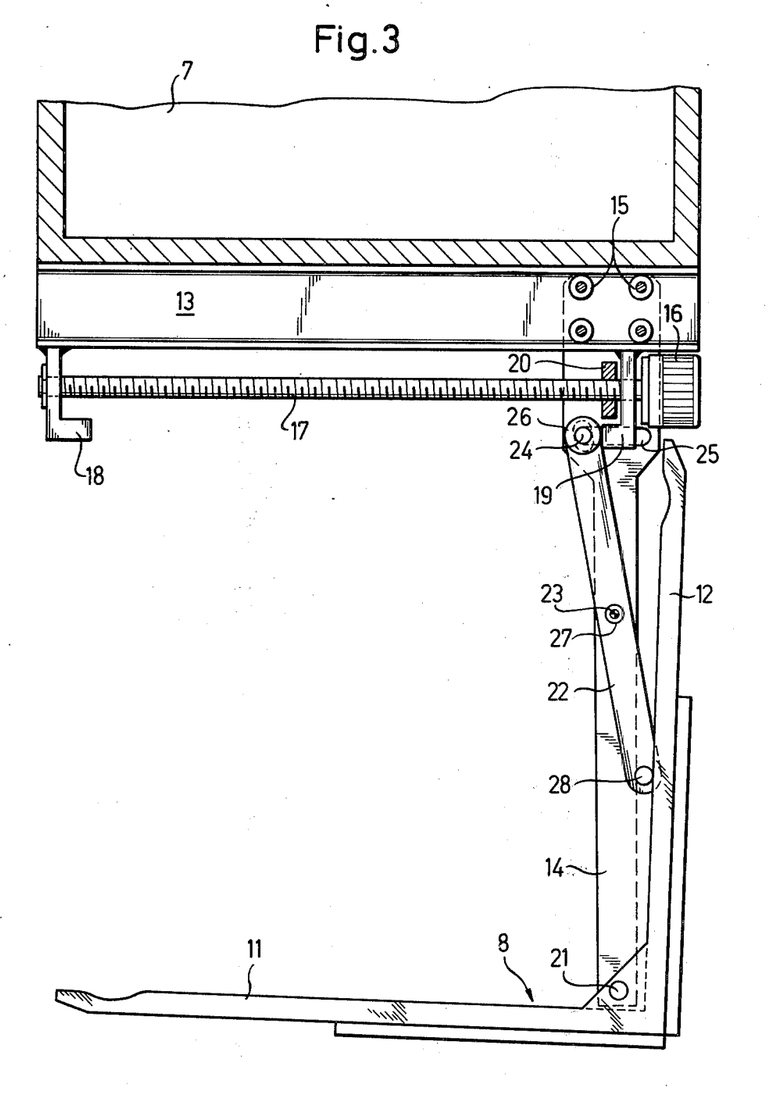

Turning now to FIGS. 2 and 3, there is shown a first preferred embodiment of a suspension by means of which each tine 8 is mounted on the cross beam 7. To the underside of the cross beam 7 there is affixed a rail 13 which has an I-section and which has a horizontal length dimension that is perpendicular to that of the cross beam 7. A vertically extending carrier arm 14 has, at its upper end, rollers 15 which engage the rail 13 and along which thus the carrier arm 14 is displaceable. The travel of the carrier arm 14 on the rail 13 is effected by a screw-and-nut drive formed of a screw member 17 and a nut 20 which is affixed to the transverse middle of the carrier arm 14. The screw member 17 which is rotated by means of a motor 16, is, at its two ends, supported in brackets 18 and 19 constituting stop members and affixed to the two ends of the rail 13. The tine 8 is articulated to the lower free end of the carrier arm 14 by means of a pivotal joint 21. FIGS. 2 and 3 show the tine 8 in its operative position which is different from that shown in FIG. 1. Thus, while in the operative position according to FIG. 1 the tine structure 8 cooperates with the storage frame 2 (tine arm 12 is horizontal), in the operative position shown in FIGS. 2 and 3 the tine 8 cooperates with the storage frame 1 (tine arm 11 is horizontal).

A two-arm rocker bar 22 is pivotally secured at 23 to the carrier arm 14 above the pivotal joint 21 in a plane between the carrier arm 14 and the tine 8. The rocker bar 22 has a pin 24 which extends into the plane of the drawing and which projects into a guide groove 25 provided in the carrier arm 14. The guide groove extends to equal distances at both sides of the vertical passing through the joint 23 and is closed at opposite ends which constitute abutments. The rocker bar 22 carries at its upper end a roller 26 which — as viewed in FIGS. 2 and 3 — is disposed in front of the rocker bar 22 and which is arranged concentrically to the pin 24. Further, a pin-shaped extension 27 of the pivotal support 23 as well as a pin 28 which is affixed to the lower free end of the rocker arm 22 project into the pivotal plane of the tine 8.

In the description which follows, the operation of the above-described suspension structure for each tine 8 will be described.

As the carrier arm 14, driven by the screw-and-nut drive 17,20 arrives at its left-hand terminal position (FIG. 2), the roller 26 of the rocker bar 22 abuts against the stop member 18. As a result of this engagement, the rocker bar 22, while the carrier arm 14 continues its leftward travel, is pivoted clockwise about the pin 23 until the pin 24 engages the right-hand terminus (abutment) of the guide groove 25. Upon this occurrence, a further leftward movement of the carrier arm 14 is blocked. In this advanced position of the tine 8, the horizontally-extending tine arm 11 projects to a maximum extent outwardly from the left-hand side of the cross-sectional outline of the cross beam 7 and penetrates into the actual storage space of the adjacent storage frame. The tine arm 11 is now adapted to lift a load off a shelf defined by two storage racks 3 positioned on the same height level. A counterclockwise tilting motion of the tine 8 is prevented by the engagement of the tine arm 12 with the pin 27, the position of which is selected in such a manner that the tine arm 11, in its operational position, is approximately oriented horizontally while the tine arm 12 is oriented approximately vertically.

If now a load is lifted off the racks 3 by virtue of a slight hoisting of the cross beam 7, the carrier arm 14 is, by virtue of actuation of the screw 17, shifted into its right-hand end position underneath the cross beam 7, as may be observed in FIG. 3. This travel of the carrier arm 14 along the rail 13 in a direction perpendicular to the length dimension of the cross beam 7 is terminated when the roller 26 abuts the stop member 19 and the rocker bar 22 has been rotated about its joint 23 counterclockwise until the pin 24 engages the left-hand terminus (abutment) of the guide groove 25. Contrary to the clockwise pivotal motion of the rocker bar 22 at the end of the leftward travel of the carrier arm 14 (FIG. 2), now the counterclockwise pivotal motion of the rocker bar 22 is transmitted by the pin 28 to the tine arm 12; as a result, the tine 8 is rotated a few degrees clockwise about its joint 21. Thus, the tine arm 11 assumes a position which is slightly inclined downward towards the joint 21. This measure prevents the rodlike articles carried on the tine arm 11 from sliding or rolling off the tine arm 11 particularly when the cross beam 7, together with the tines 8, is moved out of the service area 6 upwardly and is thereafter moved above the storage frames in a direction parallel to the depth of the storage area. It is thus seen that in case the tine arm 11 is the active member (that is, it is oriented substantially horizontally) and, simultaneously, the carrier arm is in its right-hand end position, the tine 8 will be in a withdrawn condition in which it is accommodated, substantially in its entirety, vertically underneath the cross beam 7 within the cross-sectional outline thereof.

The above-described operation has a reverse course if the tine 8 is pivoted into its other operative position in which the tine arm 11 is oriented vertically and the tine arm 12 is oriented horizontally. In order to ensure the required symmetry at the stop members 18 and 19, the latter are expediently of L-shaped configuration so that the nut 20 is free to move to a sufficient extent further horizontally above the stops 18 and 19.

Turning once again to FIG. 1, to the gantry 45 at a level above the storage frames, there are affixed deflection bars 46 and 47 which extend parallel to the cross beam 7. The horizontal distance between the cross beam 7 and each of the deflection bars 46 and 47 is such that in the withdrawn position of the tines 8 as shown in solid lines in FIG. 1, the cross beam 7 together with the tines 8, may be raised above the deflection bars 46, 47. If now a tine switching (flipping) operation is to be performed with the aid of the deflection bar 46 or 47 instead of the deflection bar 9 or 10 carried by the storage frames, first the carrier arm 14 is driven into an end position in which the tine assumes its advanced condition, whereby the horizontal tine arm will project outwardly from below the cross beam. Upon lowering the cross beam 7, the horizontal tine arm abuts against the respective deflection bar 46 or 47 (in the FIG. 1 illustration, the tine arm 12 abuts against the deflection bar 47) and, as a result, the tine 8 is flipped into its other operative position. It will be apparent by observing, for example, FIG. 2 that the tine switching operation (that is, a 90° pivotal displacement of the tine 8 about its joint 21) itself converts the "advanced" condition of the tine into a "withdrawn" condition; in its newly-switched operative position the "advanced" condition will be achieved upon moving the carrier arm 14 to the opposite end of the rail 13. A tine switching operation with the aid of the deflection bar 46 or 47 (that is, entirely outside the zone of the storage frames) is useful, for example, in case a load is to be lifted out of a truck.

Figure 4:
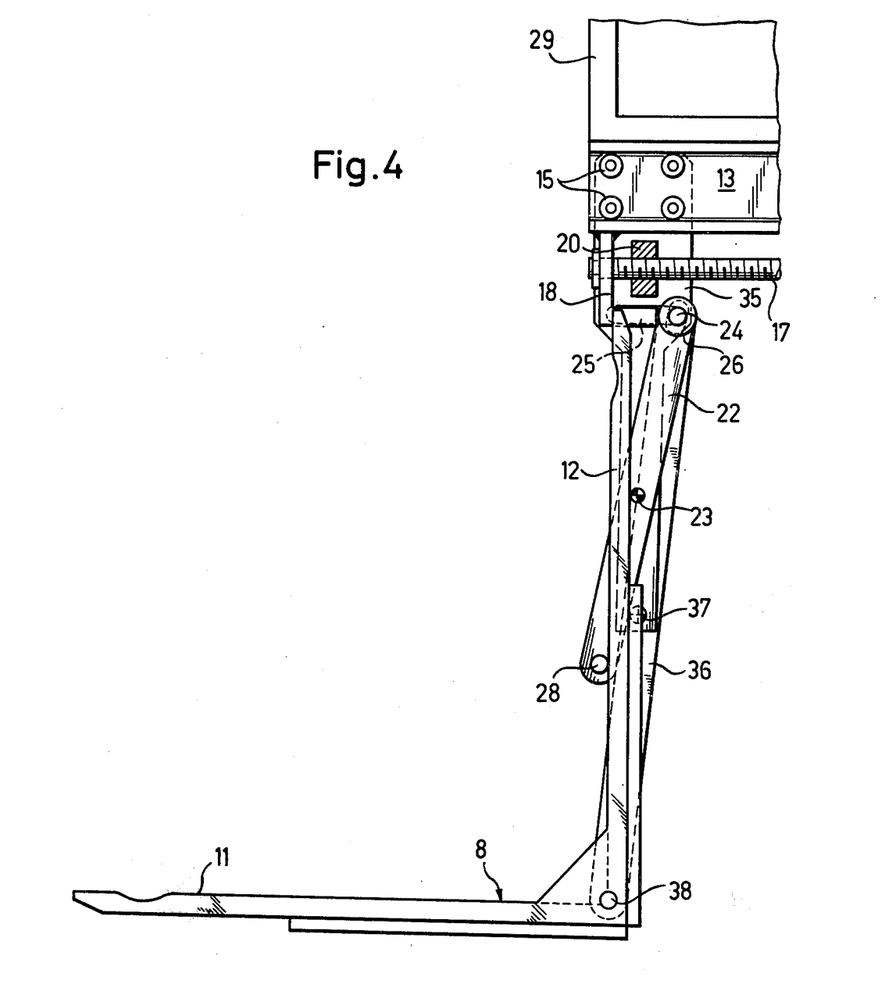
FIGS. 4 and 5 are side elevational views of another preferred embodiment of the invention in an advanced and in a withdrawn position of the tine, respectively.
Figure 5:
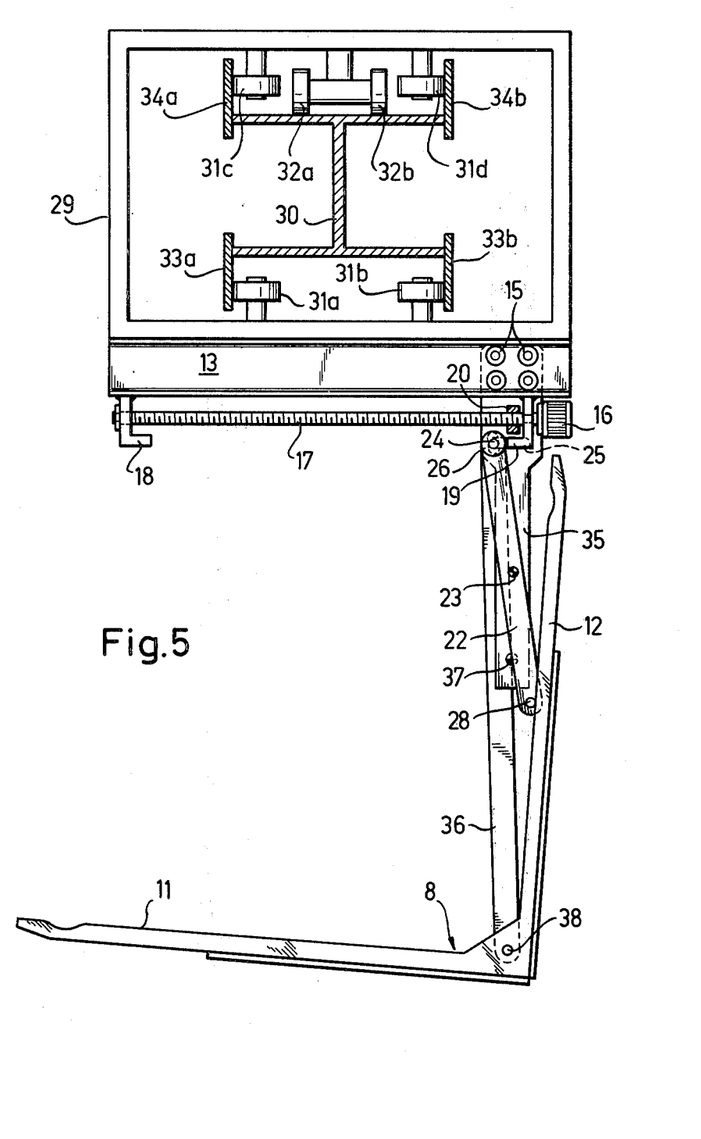

Turning now to the embodiment illustrated in FIGS. 4 and 5, the rail 13 is attached to the underside of individual frames 29, one associated with each tine 8. Each frame 29 is movably mounted on a cross beam 30 for displacement along the length dimension of the cross beam 30. To provide for such a displaceability, rollers 31a, 31b, 31c and 31d are supported by the frame for engaging, respectively, vertically oriented side walls 33a, 33b, 34a and 34b of the cross beam 30 thus serving for the lateral guidance of the frame 29. The inside of the frame 29 further carries rollers 32a and 32b which support the weight of the tine and its suspension by means of rolling contact on an upper horizontal surface forming part of the cross beam 30. The frames 29 may be shifted manually along the cross beam but, expediently, the displacement of each frame 29 is effected by a drive in such a manner that each frame can be set along the cross beam 30 individually for adjusting the position of each tine 8 in an optimum manner with regard to the articles to be handled.

To the rail 13 there is mounted a carrier arm 35 (similar to the carrier arm 14 in the previously-described embodiment) which is displaceable thereon and which has a rocker bar 22 having the same components as described in connection with FIGS. 1–3.

In contradistinction to the earlier-described embodiment, the tine 8 is suspended by means of a lever 36. The lever 36 is, as viewed in FIGS. 4 and 5, disposed behind the carrier arm 35 and is, below the pivotal support 23 of the rocker bar 22, pivotally attached to the carrier arm 35 or 37. The lever 36 supports, by means of a pivotal joint 38, the tine 8 at its lower free end, while its upper free end extends, with the pin 24, rotatably into a longitudinal opening provided at the upper free end of the rocker bar 22.

The mode of operation of the suspension of the tines 8 according to the embodiment shown in FIGS. 4 and 5 corresponds in essence to the embodiment described in connection with FIGS. 1–3. The difference resides in the fact that as the rocker bar 22 executes its pivotal motion, the lever 36, too, will execute such a displacement. The result of the swinging motion of the lever 36 is that the tine 8, in its advanced position shown in FIG. 4, projects farther from below the outline of the frame 29 whereas in the withdrawn position shown in FIG. 5, it is pulled back farther, into the zone of the frame 29. The result of this arrangement is that irregularities in the depth of the storage frames caused by loads can be compensated for. It is a further result of this arrangement that the inclination of the tines 8 in the withdrawn position shown in FIG. 5 is not as pronounced as in the case of the FIG. 3 arrangement which saves space under the frames 29 so that the latter may be of relatively narrower design.

The pin 28 serves simultaneously to prevent the tine 8 from pivoting under the effect of load so that a pin at the pivotal joint 23 (such as pin 27 in FIGS. 2 and 3) is not required here.

Figure 6:
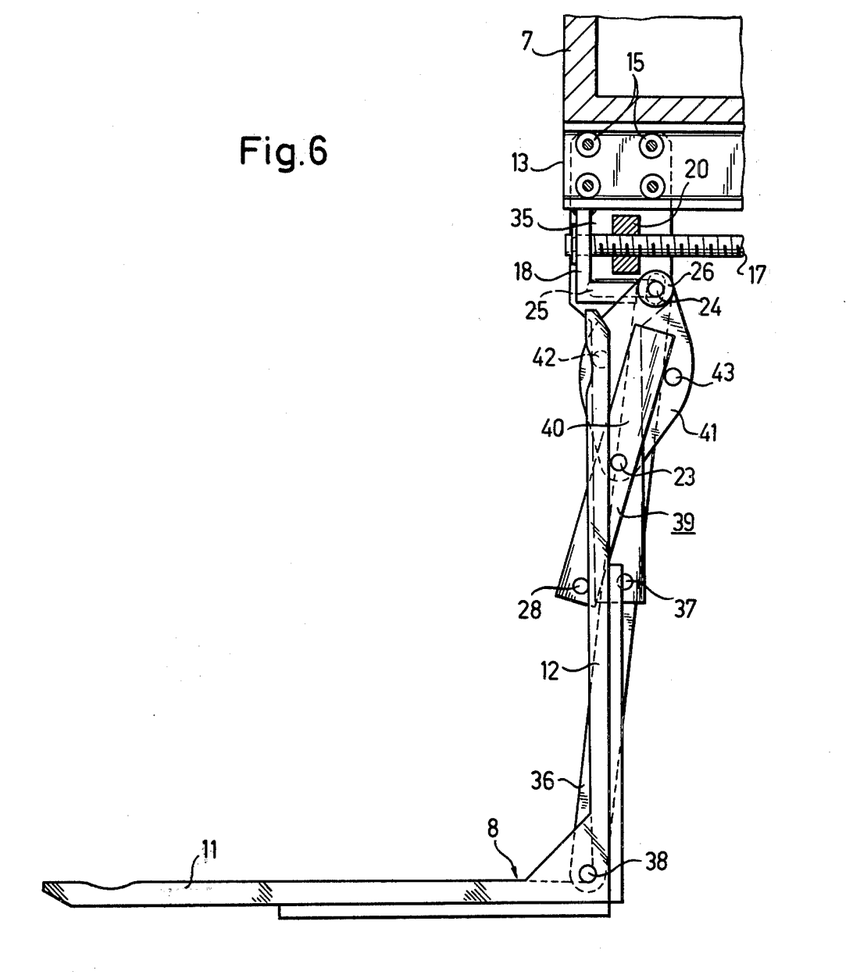
FIGS. 6 and 7 are side elevational views of a third preferred embodiment of the invention in an advanced and withdrawn position of the tine, respectively.
Figure 7:
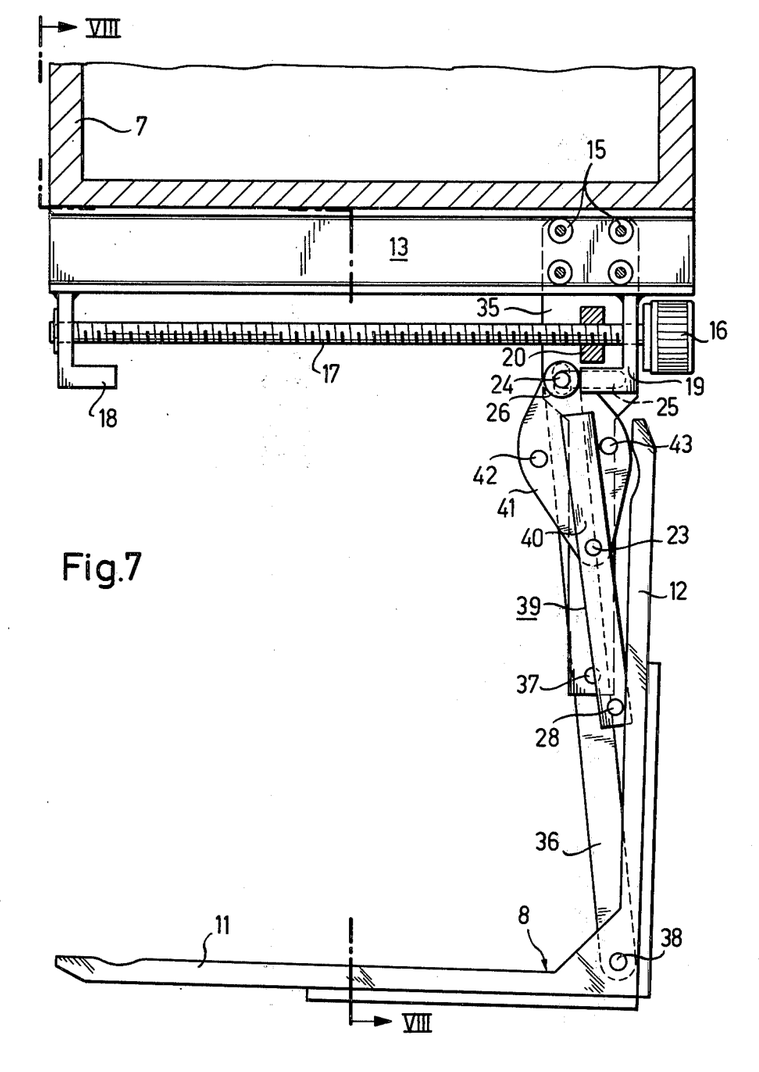

FIGS. 6 and 7 show a further embodiment of a tine suspension which differs from the embodiment of FIGS. 4 and 5 in that the upper free end of a rocker bar 39 is divided in a rocker bar half 40 and a rocker plate 41 which, at its upper end, carries the pin 24 and the roller 26. With its lower end, the rocker plate 41 is pivotally held on the carrier arm 35 at 23, together with the rocker bar 39. Symmetrically on either side of the connecting line between the axis of the pin 24 and the pivotal support 23, the rocker plate 41 carries two limit posts 42 and 43 between which the rocker bar half 40 can freely oscillate back and forth.

The free rocker bar half 40 is urged against the limit post 43 by a load on the horizontal tine arm 11, by virtue of the engagement between the vertical tine arm 12 and the pin 28 of the rocker bar 39. In the other operative position of the tine 8 (horizontally extending tine arm 12 and vertically extending tine arm 11) the rocker bar half 50 is urged counterclockwise against the limit post 42.

The above-described "toggle" motion of the rocker bar 39 has the effect that the tine 8 can be moved even farther out from below the cross-sectional outline of the cross beam 7.

Figures 8, 8A:
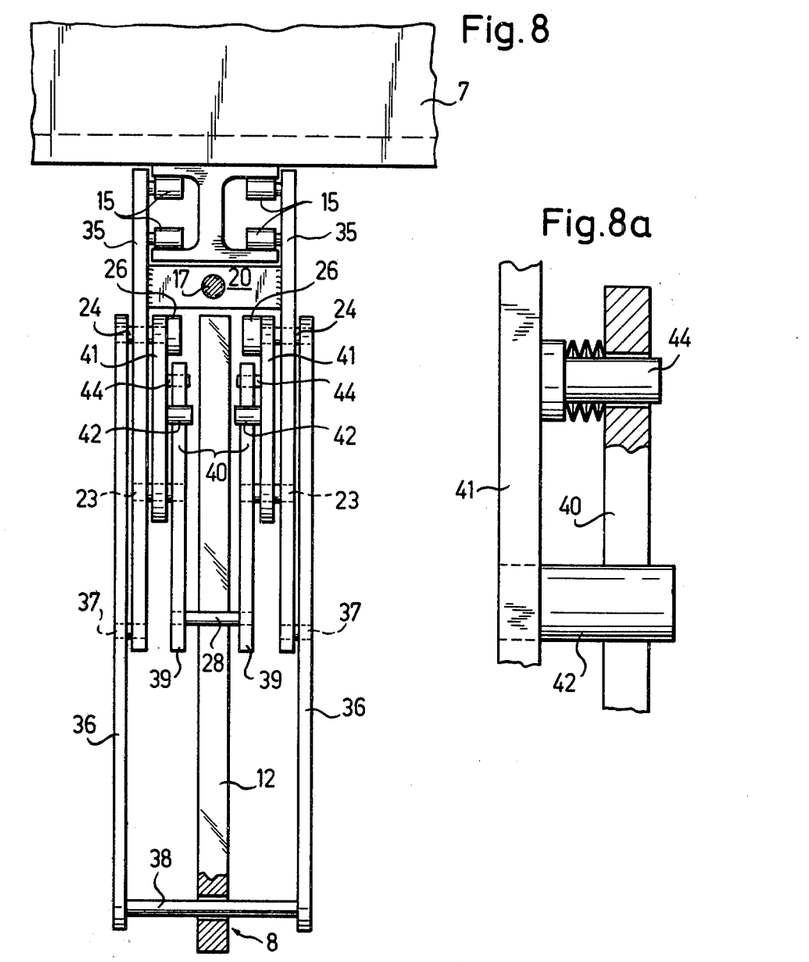
FIG. 8 is a partially sectional view taken along line VIII—VIII of FIG. 7.
FIG. 8a is an enlarged detail of the structure illustrated in FIG. 8.

FIGS. 8 and 8a are front elevational illustrations taken along line VIII—VIII of FIG. 7. FIGS. 8 and 8a illustrate particularly clearly that the arrangement of the levers and arms is expediently symmetrical at either side of each tine 8; this arrangement may apply to all the embodiments described. Furthermore, FIG. 8a shows that the arm half 40 may be attached to the rocker plate 41 by means of a brake component 44 resiliently supported by a washer spring on the rocker bar half 40 and frictionally engaging the face of the rocker plate 41 in order to ensure an impactless movement of the rocker arm half 40 between the limit posts 40 and 43. The same effect can be obtained if the rocker arm half is moved against a damping device.

It will be understood that the above description of the present invention is susceptible to various modifications, changes and adaptations, and the same are intended to be comprehended within the meaning and range of equivalents of the appended claims.

What is claimed is:

1. In a storage system including a plurality of storage frames positioned in a storage area; each frame having a length dimension extending parallel to the width of the storage area; the storage frames being aligned in the direction of depth of the storage area; a gantry movable parallel to the depth of the storage area; a horizontal cross beam vertically movably mounted on the gantry and having a length dimension oriented parallel to the width of the storage area for lowering the cross beam into the service area defined between two selected adjoining storage frames; the cross beam having a cross-sectional outline; a plurality of tines secured to the cross beam along the length thereof for depositing articles into and removing articles from selected storage frames; each tine being formed of a first and a second tine arm rigidly attached to one another at an approximately right angle; each tine being swingable in a vertical plane about a pivotal support situated in the zone of connection of the tine arms, into first and second operative positions offset about 90° with respect to one another; in the first operative position the first tine arm extending horizontally in one direction perpendicularly to the cross beam and the second tine arm extending vertically from the pivotal support; in the second operative position the second tine arm extending horizontally in the other, opposite direction perpendicularly to the cross beam and the first tine arm extending vertically from the pivotal support; the improvement comprising suspension means for securing each tine to said cross beam, said suspension means including a. a carrier arm extending generally vertically downwardly from an underside of said cross beam; said carrier arm having upper and lower portions; said tine being secured, at least indirectly, to the lower portion of said carrier arm;

b. mounting means for displaceably securing said carrier arm at its said upper end beneath said cross beam adjacent said underside thereof, said mounting means defining, for said carrier arm, a horizontal path of travel extending transversely to the length dimension of said cross beam and having a length approximately corresponding to the width of said cross beam measured parallel to the depth of said storage area; said carrier arm having first and second opposite end positions at respective opposite ends of said path of travel; when said tine is in said first operative position and simultaneously, said carrier arm is in said first end position, said tine being in an advanced condition in which said first tine arm projects substantially beyond said cross-sectional outline of said cross beam; when said tine is in said first operative position and simultaneously, said carrier arm is in said second end position, said tine being in a withdrawn condition in which substantially the entire tine is disposed within said cross-sectional outline of said cross beam; when said tine is in said second operative position and simultaneously, said carrier arm is in said second end position, said tine being in an advanced condition in which said second tine arm projects substantially beyond said cross-sectional outline of said cross beam; when said tine is in said second operative position and simultaneously, said carrier arm is in said first end position, said tine being in a withdrawn condition in which substantially the entire tine is disposed within said cross-sectional outline of said cross beam; and c. means for tilting said tine about its said pivotal support in the course of the displacement of said carrier arm and said tine from said advanced condition into said withdrawn condition for effecting a more inclined orientation of the horizontal tine arm downwards towards its said pivotal support in the withdrawn condition than in the advanced condition in the same operative position of the tine.

2. In a storage system including a plurality of storage frames positioned in a storage area; each frame having a length dimension extending parallel to the width of the storage area, the storage frames being aligned in the direction of depth of the storage area; a gantry movable parallel to the depth of the storage area; a horizontal cross beam vertically movably mounted on the gantry and oriented parallel to the width of the storage area for lowering the cross beam into the service area defined between two selected adjoining storage frames; a plurality of tines secured to the cross beam along the length thereof for depositing articles into and removing articles from selected storage frames; each tine being formed of a first and a second tine arm rigidly attached to one another at an approximately right angle; each tine being swingable in a vertical plane about a pivotal support situated in the zone of connection of the tine arms, into first and second operative positions offset about 90° with respect to one another; in the first operative position the first tine arm extending horizontally in one direction perpendicularly to the cross beam and the second tine arm extending vertically from the pivotal support; in the second operative position the second tine arm extending horizontally in the other, opposite direction perpendicularly to the cross beam and the first tine arm extending vertically from the pivotal support; the improvement comprising suspension means for securing each tine to said cross beam, said suspension means including
   a. a carrier arm extending generally vertically downwardly from an underside of said cross beam; said carrier arm having upper and lower portions; said tine being secured, at least indirectly, to the lower portion of said carrier arm;
   b. mounting means for displaceably securing said carrier arm at its said upper end beneath said cross beam adjacent said underside thereof, said mounting means defining, for said carrier arm, a horizontal path of travel extending transversely to the length dimension of said cross beam and having a length approximately equalling the width of the service area measured parallel to the depth of said storage area;
   c. first and second stop members fixedly supported at respective ends of said path of travel;
   d. a joint arranged on said carrier arm between the ends thereof;
   e. a generally vertically arranged rocker bar having upper and lower ends, said rocker bar being pivotally attached to said carrier arm by said joint between said ends of said rocker bar; said rocker bar being pivotal in a vertical plane;
   f. two abutments arranged at the upper end of said carrier arm and spaced from one another horizontally in the direction of depth of the storage area; the distance between said abutments being halved by an imaginary vertical line passing through said joint;
   g. first means carried at said upper end of said rocker bar for abutting said first and second stop members as said carrier arm approaches an end of said path of travel;
   h. second means carried at said upper end of said rocker bar and situated between said abutments for limiting the pivotal motion of said rocker bar by said abutments; and
   i. a horizontal projection carried at said lower end of said rocker bar; said horizontal projection extending into the swinging path of said tine and cooperating with the vertical tine arm for tilting said tine upon pivotal motion of said rocker bar in a predetermined direction.

3. A storage system as defined in claim 2, wherein said pivotal support of said tine is directly arranged on said lower portion of said carrier arm.

4. A storage system as defined in claim 2, further comprising
   j. means defining, in said upper portion of said carrier arm, a guide groove extending parallel to the depth dimension of said storage area; said guide groove having opposite ends constituting said abutments; and
   k. a pin attached to said upper end of said rocker bar; said pin extending horizontally into said guide groove; said pin constituting said second means carried by said rocker bar.

5. A storage system as defined in claim 2, wherein said pivotal support of said tine is arranged vertically below said joint of said rocker bar.

6. A storage system as defined in claim 2, wherein said joint of said rocker bar includes a horizontally extending pin constituting an abutment for the vertically positioned tine arm.

7. A storage system as defined in claim 2, further comprising a lever having upper and lower ends; said lever being pivotally attached, between its ends, to said lower portion of said carrier arm vertically below said joint of said rocker bar; said upper end of said lever being pivotally attached to said upper end of said rocker bar; said pivotal support of said tine being arranged on said lower end of said lever; said horizontal projection constituting an abutment for the vertically positioned tine arm.

8. A storage system as defined in claim 7, wherein said rocker bar includes an upper portion extending upwardly from said joint, said upper portion of said rocker bar being formed of a rocker bar half and a rocker plate having upper and lower ends and a mid portion; said rocker plate being pivotally attached to said carrier arm by said joint; said rocker bar half and said rocker plate being pivotal with respect to one another; said rocker plate carrying, at its said upper end, said second means; the improvement further comprising two spaced limit posts attached to said mid portion of said rocker plate for limiting the pivotal motion of said rocker arm half; the distance between said limit posts being halved by an imaginary line connecting said joint with said second means.

9. A storage system as defined in claim 8, wherein said rocker plate is positioned between said carrier arm and said rocker bar half.

10. A storage system as defined in claim 8, further comprising a brake component attached to said rocker bar half and frictionally engaging said rocker plate for effecting an impactless motion of said rocker bar half between said limit posts.

11. A storage system as defined in claim 8, further comprising a damping means operatively connected between said rocker bar half and said rocker plate for effecting an impactless motion of said rocker bar half between said limit posts.

12. A storage system as defined in claim 2, wherein said mounting means includes a rail at least indirectly supported by said cross beam; said rail defining said horizontal path of travel; said stop members being affixed to opposite ends of said rail externally of the pivotal path of said tine; and roller means carried on said upper portion of said carrier arm for engaging said rail to provide for a rolling displacement of said carrier arm on said rail.

13. A storage system as defined in claim 2, further comprising propelling means for displacing said carrier arm between said stop members along said path of travel; said propelling means including a drive screw supported to extend parallel to said path of travel; and a drive nut threadeably received on said drive screw and affixed to said upper portion of said carrier arm; said drive screw being spaced from said stop members for allowing a continuation of the travel of said drive nut on said drive screw subsequent to abutment between said first means and the respective stop member.

14. A storage system as defined in claim 13, wherein said propelling means further comprises a motor operatively connected to said drive screw for rotating the same.

15. A storage system as defined in claim 2, wherein said first means carried by said rocker bar includes a first roller for abutting the respective stop member; said horizontal projection of said rocker bar carries a second roller for abutting the vertically-positioned tine arm.

16. A storage system as defined in claim 2, the improvement further comprising means for securing said mounting means to said cross beam for displacement along said cross beam in a direction parallel to the width dimension of said storage area.

17. A storage system as defined in claim 16, wherein the means for displaceably securing said mounting means to said cross beam includes a frame member to which said mounting means is affixed; and roller means carried by said frame member and engaging said cross beam to provide for a rolling displacement of said mounting means along the length of said cross beam.

18. A storage system as defined in claim 1, further comprising deflection bars supported by said gantry above said storage frames; said deflection bars extending on either side of said cross beam parallel thereto and substantially along the entire length thereof; each deflection bar being horizontally spaced from said cross beam to an extent to provide unobstructed vertical passage of said cross beam and said tine in said withdrawn condition of said tine; each deflection bar being horizontally spaced from said cross beam to an extent to effect, in said advanced condition of said tine, an abutment between the horizontal tine arm and the respective deflection bar upon lowering said cross beam from a level above said deflection bars to a level therebelow for pivoting said tine from one of its said operative positions into the other.

* * * * *